Patented Apr. 14, 1936

2,037,522

UNITED STATES PATENT OFFICE 2,037,522

HARD BOARD AND METHOD OF MAKING SAME

Thor Axel Ivar Lundbäck, Stockholm, Sweden, assignor to Aktiebolaget Mo Och Domsjo Wallboard Company, Ornskoldsvik, Sweden, a corporation of Sweden No Drawing. Original application March 1, 1933, Serial No. 659,246. Divided and this application April 25, 1935, Serial No. 18,264. In Sweden October 5, 1932

6 Claims. (Cl. 92—55)

This application is a division of my copending application, U. S. Serial No. 659,246, filed March 1st, 1933.

The present invention relates to a method of making hard boards, such as boards for building and fitting purposes, and is mainly characterized in that finely divided lignin-containing cellulosic material, e. g. wood fiber, is subjected together with 0.1–10% by weight of an aldehyde, to the action of heat and pressure. This general idea embraces the use of substances which while not reacting directly with the lignin under ordinary conditions, yet under the operating conditions, i. e. under the action of heat and pressure are transformed or converted into an aldehyde, or which added substances will form an aldehyde by reaction with other substances present, e. g. especially added bodies.

In the production of insulating board by treating wood fiber material under heat and pressure it was unexpectedly found that an addition to the material of an aldehyde or aldehydic substance results in board of superior tensile and breaking strengths, hard and glossy surface and light and attractive exterior, which board also in other respects surpasses the heretofore known insulating board produced by hot-pressing ground wood or exploded fiber material.

This surprising effect I ascribe to a condensation between the lignin of the cellulosic material and the added aldehyde. The constitution of the lignin substances is still comparatively unknown. In the treatment of wood with sulphite solution or a solution of NaOH the lignin is dissolved. From the sulphite solution a lignin sulphonic acid $C_{40}H_{46}S_2O_{17}$ has been recovered, and hence the composition of lignin has been calculated as $(C_{40}H_{42}O_{11})_n$. It has been assumed that lignin comprises both free and etherized hydroxyl groups (methoxyls, $OCH_3$, acetyl and formyl groups).

Experimental tests made by me go to show: first that lignin possesses a somewhat tautomeric character, second that lignin reacts with certain suitable substances to form condensation products. When treated with a phenol lignin reacted as an aldehyde; when treated with an aldehyde it reacted as a phenol. This confirms the hypothesis that lignin possesses tautomeric character. The great hardness and strength of the products obtained according to the invention is no doubt due to the formation of a condensation product between the lignin and the added aldehyde.

The desired effect may be brought about in several ways. Thus the cellulosic material together with the aldehydic substance may be subjected to a treatment with the application of heat and pressure in which the pressure and heating steps are quite independent of each other, it being possible for instance to dry the material completely or partially prior to the beginning of the pressing operation.

The method according to the invention is especially adapted for use in the production of fiber board of the wallboard type and will be described below in connection with such application, it being understood, however, that this embodiment is only an example of the many possible variations of the process according to the invention.

The raw material such as wood in small pieces or chips is first converted into fiber. The raw material may be subjected in a closed high pressure chamber to penetration by elastic fluid such as steam and then progressively forced out from said chamber. Prior to the forming operation the mass may be soaked in water, if desired containing sizing and fireproofing agents as well as an aldehyde or an aldehydic substance. The raw material may however be ground or fibrated in other ways so long as the lignins or the principal part thereof are retained.

After the fibration, a refinement as in a beater or the like is not essential and if there is any further refinement, same is preferably not extensive.

The fiber is formed into sheets from an aqueous suspension, which may contain one or more aldehydes, for instance in a dissolved state and in which, if desired, also materials for making the product more waterproof or fire resistant or both may be present. The quantity of the aldehyde or aldehydic substance added should be proportioned so as to amount to 0.1 to 10%, preferably 5% by weight calculated on the dry material.

Some of the excess water may be eliminated by preliminary pressing of the sheet as by means of squeezing rolls.

The sheets thus obtained are dried under heat and pressure. In the manufacture of boards the material is preferably first prepared as a long sheet which is cut into lengths as desired, and these lengths are introduced into a heated press, as, for example, between steam heated press platens.

Pressures ranging between 10 and 450 kgs/cm² depending upon the nature of the added substances have given very satisfactory results. The temperature of the press platens may vary between 100 and 260° C., preferably between 160 and 180° C. In most cases a pressure of about 60 kgs/cm² is sufficient.

The heating and the pressing steps may also be effected independently of each other. Thus the material may be completely or partially dried prior to the beginning of the pressing operation. After the mass has been pressed to the desired thickness the boards thus obtained are removed from the hot press. The product is hard and of light exterior and shows excellent qualities of strength. It has been found that the best results are obtained if the pressed mass is allowed to cool while maintaining the pressure acting thereupon, it being possible, if desired, to accelerate the cooling e. g. by supplying for instance to the press platens cooling agents, as liquids, e. g. water, or gases, e. g. air. The pressure acting upon the mass may also be reduced slowly, continuously or intermittently, during the cooling of said mass.

According to another embodiment the mass is pressed between a pressure-actuated platen which is adapted to be heated, and a wire gauze, for instance a wire cloth whereby the elimination of moisture is facilitated and the drying accelerated. According to still another embodiment the mass, prior to the pressing, is formed into sheets which are then enveloped by wire gauze, heat and pressure being subsequently applied.

One may also first partially dry without special pressure and then press under continued drying. Also the pressing operation may obviously be interrupted, the drying then being completed without the application of pressure although best results are obtained by drying and subsequent cooling under pressure in the press.

Generally the pressing operation is effected at a temperature and a pressure which are so proportioned that the aldehydic substance or substances are not decomposed. If comparatively elevated press temperatures are desired such may be used if care is taken that the decomposition of the aldehydric substance is prevented at the operating temperature through the application of pressure, for instance so that the condensation is effected e. g. between press platens in a closed pressure chamber which contains vapours of the aldehydric substance. If the substance in question can be vaporized at ordinary atmospheric pressure without decomposition the hot pressing may obviously be effected in an atmosphere of vaporized substance, and a closed pressure chamber may be dispensed with.

As stated above such embodiments are also within the spirit of the invention where one adds substances which, while not reacting with the lignin or cellulose under ordinary conditions, yet under the operating conditions e. g. by treatment under heat or pressure are transformed or converted into an aldehyde or aldehydic substance, or will form such aldehyde or aldehydic substance with other substances present, e. g. especially added bodies.

The invention also comprises a hard board consisting essentially of finely divided cellulosic material bonded together by means of a reaction product of lignin and an aldehyde.

What I claim is:—

1. The method of making hard boards which comprises fibrating lignin-containing cellulosic material in such a manner that the principal part of the lignins thereof is retained, transforming the fiber-lignin mass into an aqueous suspension to which is added 0.1 to 10% by weight, calculated on the dry cellulosic material, of an aldehyde, forming the mixture into sheets, pressing the sheets thus formed between heated press members.

2. The method of making hard boards which comprises fibrating lignin-containing cellulosic material in such a manner that the principal part of the lignins thereof is retained, transforming the fiber-lignin mass into an aqueous suspension to which is added 0.1 to 10% by weight, calculated on the dry cellulosic material, of formaldehyde, forming the mixture into sheets, pressing the sheets thus formed between heated press members.

3. The method of making hard boards which comprises fibrating lignin-containing cellulosic material in such a manner that the principal part of the lignins thereof is retained, transforming the fiber-lignin mass into an aqueous suspension to which is added 0.1 to 10% by weight, calculated on the dry cellulosic material, of an aldehyde, forming the mixture into sheets, pressing the sheets thus formed between heated press members, the temperature ranging between 100 and 260° C. and the pressure ranging between 10 and 450 kgs/cm², the press members being then cooled while maintaining pressure upon the sheet.

4. The method of making hard boards which comprises preparing an aqueous suspension containing fibrated lignin-containing cellulosic material and from 0.1% to 10% by weight, calculated on the dry weight of the cellulosic material, of an aldehyde, forming the suspension into sheets and pressing the sheets between heated press members.

5. The method of making hard boards as defined in claim 4 in which the aldehyde used is formaldehyde.

6. As a new product, a hard board formed by preparing an aqueous suspension containing fibrated lignin-containing cellulosic material and from 0.1% to 10% by weight, calculated on the dry weight of the cellulosic material, of an aldehyde, forming the suspension into sheets and pressing the sheets between heated press members, said board consisting essentially of finely divided cellulosic material bonded together by means of a reaction product of lignin and the aldehyde.

THOR AXEL IVAR LUNDBÄCK.